May 12, 1936.  F. M. GREEN  2,040,551
BRAKE SHOE
Filed Nov. 13, 1934
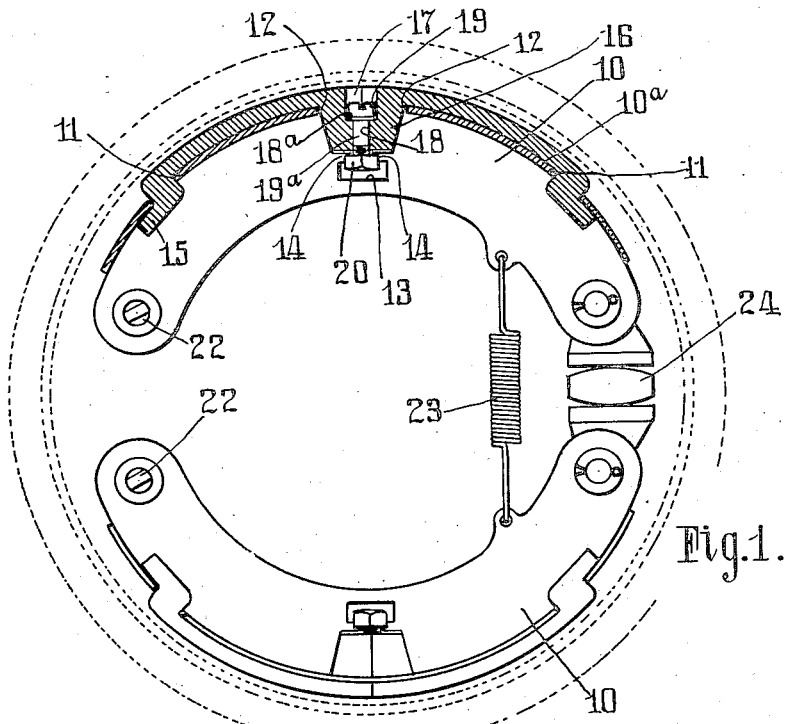
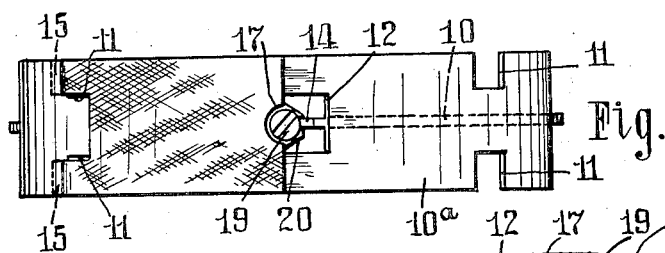
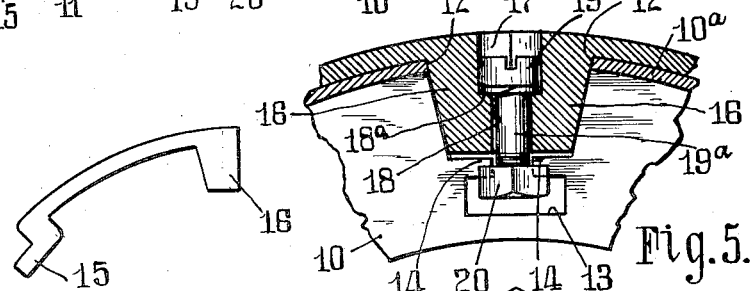
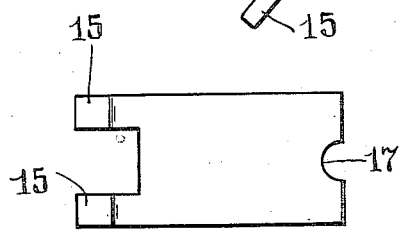
Inventor
FLOYD M. GREEN
By
Attorneys Patented May 12, 1936

2,040,551

UNITED STATES PATENT OFFICE 2,040,551

BRAKE SHOE

Floyd Milton Green, Columbus, Ohio

Application November 13, 1934, Serial No. 752,838

4 Claims. (Cl. 188—234)

This invention relates more particularly to brakes and especially to the type in which a pair of shoes work against the internal surface of a drum rim.

One special object of the invention is to provide a brake shoe permitting the ready application of a lining thereto even by the ordinary driver of a motor vehicle and without resorting to a skilled workman. Another object of the invention is to provide a lining of a durable construction that will operate effectively and will wear well and not require frequent renewals or repair. Further objects will appear from the disclosure herein, and while I have mentioned that my invention is especially useful on motor vehicles it is not confined to this use.

The invention is embodied in the example hereing particularly shown and described, the features of novelty being pointed out in the claims.

In the accompanying drawing—

Figure 1 illustrates a pair of the brakes according to my invention as assembled for mounting in a brake drum, the latter being in broken lines.

Fig. 2 is a top plan view of the upper brake member as shown in Fig. 1, with the right hand half-lining member removed.

Fig. 3 illustrates an edge view of the half-lining shown in Fig. 2.

Fig. 4 illustrates a plan view of the half-lining member shown in Fig. 3 as it appears when turned to horizontal position generally.

Fig. 5 is an enlarged detail view, partly in section, to illustrate how the adjacent or contiguous ends of the two half-linings of the shoe are held together and to the shoe.

Fig. 6 is a top plan view of the nut shown in Fig. 5 above.

As the shoes and their linings are substantially identical a description of one of them and its lining will suffice for both.

In the views the shoe proper includes a curved web member 10 having secured thereto at its outer edge a correspondingly curved crown or cross member 10ª; these parts being of metal and commonly welded one to the other at the center line of the cross member 10ª.

Each cross member or crown 10ª is provided near one end with opposed notches or recesses 11, 11, and at the opposite end with a middle recess or notch 12, said notch coinciding with or extended as a tapered notch in the web 10.

The web 10 below the tapered notch 12 is made with a rectangular opening 13 with a central narrow opening connecting it with the notch 12 so that two tongues or lugs 14, 14, are formed in the web.

The liner member, one of which is shown in detail in Figs. 4 and 5 is formed or molded of resin, natural or synthetic, or suitable hard composition, such as "Bakelite" having its outer or convex surface containing, molded therewith, a layer of asbestos or other suitable rough material to make an energetic friction surface.

These half-lining members are substantially identical in form and size and each is provided at one end with depressed tongues 15, 15, extended outwardly in the direction of the length of the liner and at its other end with a depressed end portion 16 provided with a large semi-cylindrical recess 17 extended as a smaller semi-cylindrical recess 18 with a shoulder 18ª between them so that when the two half-linings are placed together, end to end, as seen in Figs. 1 and 5 the said recesses match and form a cylindrical socket for a bolt and its head 19 and threaded stem 19ª.

The character 20 designates the threaded nut for holding the aforesaid bolt, said nut being provided in one of its faces with a diametrical cross-groove 20ª, as shown in Fig. 6.

When the liner members are to be installed the hook members 15, 15, thereof are first inserted in somewhat erected position into notches 11, 11, and the inner matching ends thereafter turned down into the recesses 12. After this the nut is placed and held up in the rectangular opening 13 with groove 20ª of the nut engaged with the tongues 14. And finally a split washer and the bolt are inserted into the socket and the bolt turned with a screw driver until tight thereby securing both the liner half members each at both their ends to the crown or base of the shoe and forming a substantially continuous convex braking surface to cooperate with the brake drum.

The two shoes carrying the liners are each pivoted at one end as indicated at 22, 22, to the drum wall while the other ends thereof are normally held out of contact with the drum braking surface by a spring 23 connecting them, said spring cooperating with a cam 24. The brake shoes are pushed asunder into braking contact with the drum by any usual means such as the aforesaid cam 24 rocked by the usual pedal, not shown.

It will be observed that a brake liner such as described, can be easily and quickly applied by a driver and can be worn nearly entirely through without ending its efficiency.

The forms of the parts can be changed without departing from the gist of the invention as claimed.

What I claim is:

1. A brake device including a brake head having a web and a crown portion having an arcuate liner-receiving face, said crown and an adjacent web portion centrally recessed, and two liner members applied to said receiving face, each of said liner members having at one of its ends a bent portion integral with the liner extended therefrom in the direction of the length of the liner to engage the crown at one end thereof, and each of said liner members having at its other end a thickened portion provided with a recess to match the recess of the other member to form a shouldered opening to receive and support means for holding said members in position.

2. A brake device including a brake head having a web and a crown portion having an arcuate liner-receiving face, said crown and an adjacent web portion centrally recessed with inwardly converging sides, and two liner members applied to said receiving face, each of said liner members having at one of its ends a bent portion integral with the liner extended therefrom in the direction of the length of said liner to engage the crown at one end thereof, and each of said liner members having at its other end a thickened portion with one side thereof matching a converging side of the crown and web of the brake head with a recess to match the recess of the other member to form a shouldered opening to receive and support a screw bolt, a screw bolt supported in said opening with its end projecting beyond said opening, and a nut engaged by the thread of said bolt and said web.

3. A brake device including a brake head having a web and a crown portion having an arcuate liner-receiving face, said crown and an adjacent web portion centrally recessed, the recess of said web extended to form a tongue, and two liner members applied to said receiving face, each of said liner members having at one of its ends a bent portion extended therefrom to engage the crown at opposite ends, and each of said liner members having at its other end a thickened portion provided with a recess to match the recess of the other liner member to form a shouldered opening to receive and support a headed screw bolt, a headed screw bolt supported in said opening with its end projecting beyond said opening, and a nut engaged by the thread of said bolt and the aforesaid tongue of the web.

4. A brake device including a brake head having a web and a crown portion having an arcuate liner-receiving face, said crown and an adjacent web portion centrally recessed, and two liner members applied to said receiving face, each of said liner members having at one of its ends a bent portion extended therefrom to engage the crown at one end thereof, and each of said liner members having at its other end a thickened portion provided with a recess to match the recess of the other member to form a shouldered opening to receive and support a headed screw bolt, and a headed screw bolt supported in said opening with its end projecting beyond said opening, and nut engaged by the thread of said bolt and said web.

FLOYD MILTON GREEN.